US012090613B2

(12) United States Patent
Tanaka et al.

(10) Patent No.: US 12,090,613 B2
(45) Date of Patent: Sep. 17, 2024

(54) PNEUMATIC TOOL

(71) Applicant: MAX CO., LTD., Tokyo (JP)

(72) Inventors: Hiroshi Tanaka, Tokyo (JP); Kazuya Mochizuki, Tokyo (JP); Kousuke Moriwaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 391 days.

(21) Appl. No.: 17/361,731

(22) Filed: Jun. 29, 2021

(65) Prior Publication Data

US 2021/0402578 A1 Dec. 30, 2021

(30) Foreign Application Priority Data

Jun. 30, 2020 (JP) ................................. 2020-113616

(51) Int. Cl.
*B25C 1/04* (2006.01)
*B25C 1/00* (2006.01)
*H01H 43/00* (2006.01)

(52) U.S. Cl.
CPC .............. *B25C 1/047* (2013.01); *B25C 1/008* (2013.01); *H01H 43/00* (2013.01); *B25C 1/043* (2013.01)

(58) Field of Classification Search
CPC ......... B25C 1/047; B25C 1/008; B25C 1/043; H01H 43/00
See application file for complete search history.

(56) References Cited

U.S. PATENT DOCUMENTS 5,772,096 A * 6/1998 Osuka ..................... B25C 1/008 227/8
2002/0125290 A1 9/2002 Robinson
2017/0173771 A1* 6/2017 Grandjean ................ B25F 5/00
2018/0117748 A1 5/2018 Ishikawa et al.
2019/0099870 A1 4/2019 Tanaka
2019/0291253 A1* 9/2019 Knight .................... B25C 1/047
2019/0375083 A1 12/2019 Ishikawa et al.
2019/0389045 A1 12/2019 Ishikawa et al.
2021/0122018 A1 4/2021 Aizawa et al.

FOREIGN PATENT DOCUMENTS

| | | | |
|---|---|---|---|
| CN | 110382168 | A | 10/2019 |
| EP | 3552767 | A1 | 10/2019 |
| JP | 2002-254348 | A | 9/2002 |
| JP | 2016-179526 | A | 10/2016 |
| JP | 2018-144123 | A | 9/2018 |
| TW | 201919828 | A | 6/2019 |
| TW | 201941883 | A | 11/2019 |

OTHER PUBLICATIONS

Extended European Search Report dated Nov. 25, 2021, issued by the European Patent Office in the corresponding European Patent Application No. 21182501.3. (9 pages).
Oct. 3, 2023—(JP) Notice of Reasons for Refusal—JP App 2020-113616, Eng Tran.

* cited by examiner

*Primary Examiner* — Zoheb S Imtiaz
(74) *Attorney, Agent, or Firm* — Banner & Witcoff, Ltd.

(57) ABSTRACT

A pneumatic tool includes a trigger configured to perform a first operation of operating a drive part, a contact member configured to perform a second operation of operating the drive part, a timer configured to measure the time during which the drive part can be operated by the second operation of the contact member and to switch the operation mode of the drive part after the time has elapsed, and a timer switch configured to control the operation of the timer. The first operation of the trigger is transmitted to the timer switch using a transmitting member.

6 Claims, 11 Drawing Sheets

PNEUMATIC TOOL

CROSS-REFERENCE TO RELATED APPLICATIONS

This application is based upon and claims the benefit of priority from prior Japanese patent application No. 2020-113616, filed on Jun. 30, 2020, the entire contents of which are incorporated herein by reference.

TECHNICAL FIELD

The present disclosure relates to a pneumatic tool.

BACKGROUND ART

Conventionally, a pneumatic tool has been used in which and a driver connected integrally with a striking piston strikes a nail into an object by reciprocating the striking piston slidably provided in a striking cylinder by using compressed air as a drive source.

As a striking method of a pneumatic tool, for example, a contact striking in which a nail is struck into an object in a state where a contact arm is pressed against a member to be struck while a trigger is pulled, and a trigger striking in which a nail is struck into an object by pulling a trigger from a state in which a contact arm is pressed against an object are known.

Here, in the case of performing the contact striking, a pneumatic tool may operate to erroneously fire a nail when the contact arm is inadvertently pushed while the trigger is stilled pulled. Therefore, in a pneumatic tool, in order to prevent unintentional erroneous firing of a nail, a timer is provided to limit the operation of the pneumatic tool when a certain period of time has elapsed in a state where a trigger is pulled.

For example, a timer may be configured by an air valve or a circuit and the air valve or the circuit may be operated in response to a pulling operation of a trigger. PTL 1 discloses a pneumatic fastener drive tool in which, when a workpiece contact element does not come into contact with a workpiece within a predetermined time, for example, 1 to 4 seconds, a sufficient amount of air flows out from a tank and an allowed valve assembly is closed through a pneumatic signal line to render the tool inoperable.

CITATION LIST

Patent Literature

PTL 1: JP-A-2002-254348

SUMMARY OF INVENTION

By the way, in the pneumatic fastener drive tool disclosed in PTL 1, it is also conceivable to reduce the size of the tool by arranging a safety mechanism including a timer in a space inside a grip used as a chamber, for example. However, when the timer is arranged in the space inside the chamber, an operating direction of the trigger and an operating direction of the timer may be different, and hence, there is a problem that the load direction of the trigger must be converted. Further, in the conventional pneumatic tool, the operation load of a timer switch for operating a timer is applied in addition to the operation load of the trigger, and hence, there is a problem that operation load of the operator increases.

Therefore, in order to solve the above problems, the present disclosure aims to provide a pneumatic tool that includes a timer operated by an operation of a trigger and can reduce the operation load of an operator by providing a transmitting mechanism for transmitting the operation of the trigger.

According to an aspect of the present invention, there is provided a pneumatic tool including: a trigger configured to perform a first operation of operating a drive part; a contact member configured to perform a second operation of operating the drive part; a timer configured to measure the time during which the drive part can be operated by the second operation of the contact member and to switch the operation mode of the drive part after the time has elapsed; and a timer switch configured to control the operation of the timer, wherein the first operation of the trigger is transmitted to the timer switch using a transmitting member.

According to the present disclosure, since the transmitting member for transmitting the operation of the trigger to the timer switch is provided, the load direction based on the operation of the trigger can be converted into the load direction for operating the timer switch.

Further, according to the present disclosure, since the timer switch and the timer can be operated via the transmitting member by operating the trigger, the operation load of the operator can be reduced as compared with the case where both the trigger and the timer switch are operated.

DESCRIPTION OF EMBODIMENTS

Hereinafter, a preferred embodiment of the present disclosure will be described in detail with reference to the accompanying drawings.

Configuration Example of a Nailing Machine 1

Figure 1:
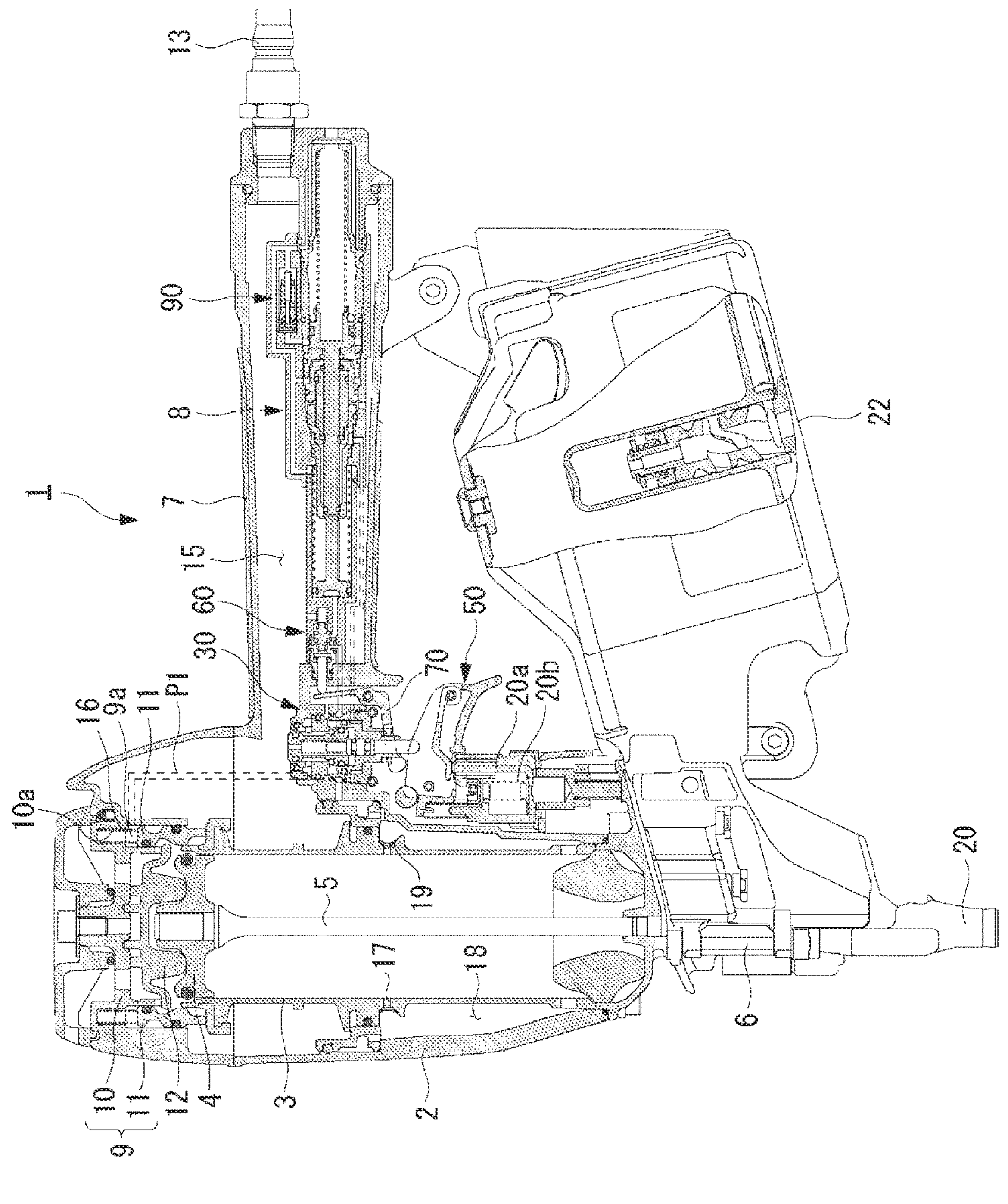
FIG. 1 is a side sectional view of a nailing machine according to the present embodiment.
Figure 2:
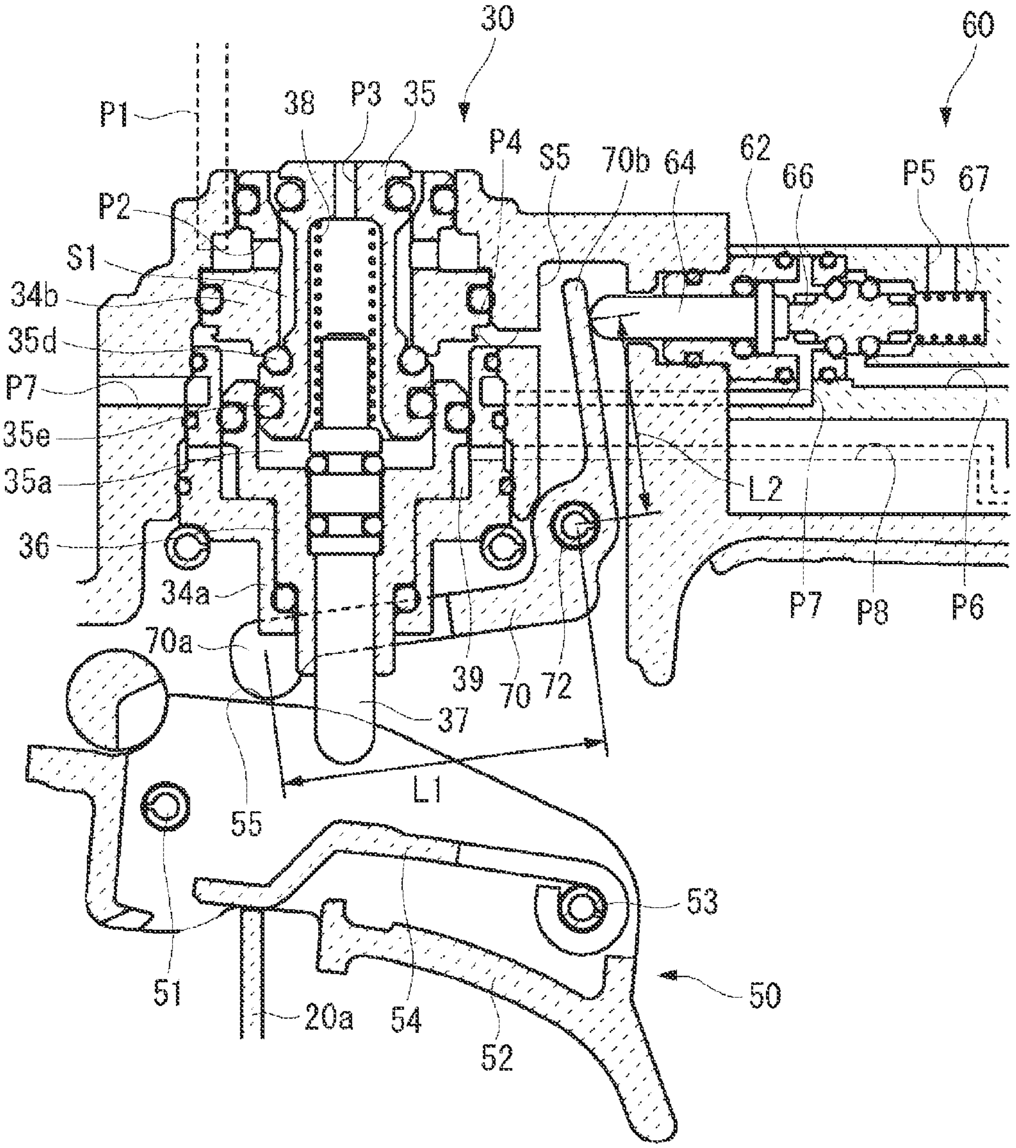
FIG. 2 is an enlarged view of a trigger valve, a trigger, a timer switch, and a link member according to the present embodiment.
Figure 3A:
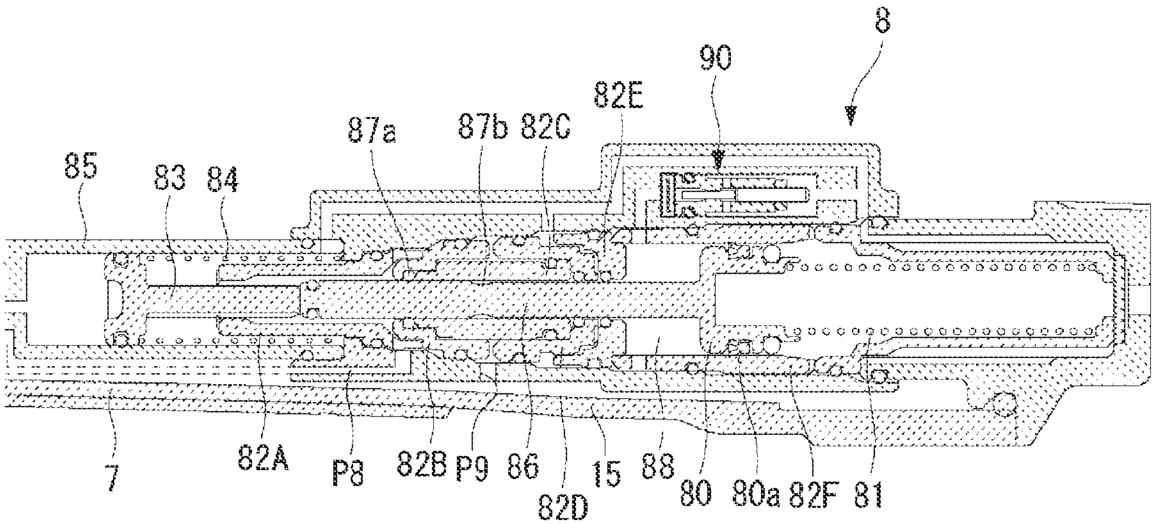
FIG. 3A is an enlarged view of a timer according to the present embodiment.
Figure 3B:
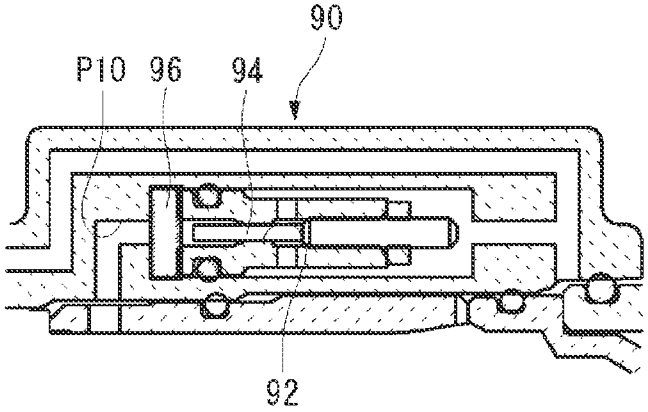
FIG. 3B is an enlarged view of a throttle part constituting the timer according to the present embodiment.

FIG. 1 is a side sectional view of a nailing machine 1 according to the present embodiment, FIG. 2 is an enlarged view of a trigger valve 30, a trigger 50, a timer switch 60, and a link member 70 according to the present embodiment, FIG. 3A is an enlarged view of a timer 8 according to the present embodiment, and FIG. 3B is an enlarged view of a throttle part 90 constituting the timer according to the present embodiment. FIGS. 1 and 2 show a state before compressed air is supplied into a main chamber 15 of the nailing machine 1, and FIGS. 3A and 3B show a state while compressed air is supplied into the main chamber 15 of the nailing machine 1.

In the present embodiment, considering the usage pattern of the nailing machine 1, the side where the contact arm 20 is provided is defined as the lower side of the nailing machine 1, and the opposite side thereof is defined as the upper side of the nailing machine 1. Further, the side where a housing 2 is provided is defined as the front side of the nailing machine 1, and the opposite side thereof is defined as the rear side of the nailing machine 1.

As shown in FIG. 1, the nailing machine 1, which is an example of a pneumatic tool, includes the cylindrical housing (tool body) 2 extending in an upper and lower direction, a grip 7 extending from a side surface of the housing 2 in a direction (front and rear direction) substantially orthogonal to an operating direction of the trigger 50 (to be described later), a nose 6 protruding downward from a lower end portion of the housing 2, and a magazine 22 for supplying a nail (not shown) to the nose 6. An air plug 13 to which one end portion of an air hose (not shown) can be connected is provided at a rear end portion of the grip 7. An air compressor (not shown) is connected to the other end portion of the air hose.

A striking cylinder 3 is provided inside the housing 2, and a striking piston 4 is provided inside the striking cylinder 3 so as to be slidable in an upper and lower direction (axial direction). A rod-shaped striking driver 5 is integrally connected to a lower surface of the striking piston 4. The striking piston 4 is driven by compressed air supplied from the main chamber 15 and guides the striking driver 5 to the nose 6 to strike out a nail (not shown) supplied from the magazine 22 to the hose 6 toward an object.

The main chamber 15 capable of containing compressed air is provided inside the grip 7. Compressed air is supplied from an air compressor into the main chamber 15 via an air hose connected to the air plug 13.

A blowback chamber 18 is provided inside the housing 2 and on an outer peripheral portion on the lower side of the striking cylinder 3. The blowback chamber 18 contains compressed air for returning the striking piston 4 after the striking operation. The blowback chamber 18 communicates with the inside of the striking cylinder 3 via an inflow/discharge port 17 formed in a substantially intermediate portion in the upper and lower direction of the striking cylinder 3, and compressed air in the main chamber 15 is supplied into the blowback chamber 18 via the striking cylinder 3. The inflow/discharge port 17 is provided with a check valve 19 that allows air to flow from the striking cylinder 3 to the blowback chamber 18 but regulates the flow of air from the blowback chamber 18 to the striking cylinder 3.

A head valve 9 having a substantially annular shape is provided on the upper side of the striking cylinder 3. The head valve 9 includes a head valve cylinder 10 provided at an upper end portion of the housing 2, and a head valve piston 11 arranged inside the head valve cylinder 10 so as to be slidable in the upper and lower direction.

A recess 10*a* is provided on a peripheral edge of the head valve cylinder 10, and the head valve piston 11 is arranged in the recess 10*a* via a spring 16. The head valve piston 11 is urged downward by the spring 16, and a lower surface of the head valve piston 11 is in close contact with an upper end edge of the striking cylinder 3. The head valve piston 11 is in close contact with an inner wall surface of the recess 10*a* via an O-ring and forms a head valve chamber 9*a* which is a space between the head valve piston 11 and the recess 10*a*. The head valve chamber 9*a* communicates with a passage P2 (see FIG. 2, to be described later) of the trigger valve 30 via a passage P1.

When the head valve piston 11 is located at a bottom dead center, that is, when a lower end portion of the head valve piston 11 is in close contact with an upper end edge of the striking cylinder 3, the inside of the main chamber 15 and the inside of the striking cylinder 3 are shut off. When the head valve piston 11 is located at a top dead center, that is, when the lower end portion of the head valve piston 11 is separated from the upper end edge of the striking cylinder 3 to form a gap, the inside of the main chamber 15 and the inside of the striking cylinder 3 communicate with each other via the gap.

A piston stop 12 made of, for example, an elastic member is provided inside the head valve piston 11. When the striking piston 4 returns to the top dead center, the piston stop 12 holds the striking piston 4 at the top dead center while reliably preventing the striking piston 4 from rebounding.

Further, as shown in FIGS. 1 to 3B, the nailing machine 1 includes the trigger valve 30 that operates a drive part including the striking piston 4 and the head valve 9 and the like, the trigger 50 that performs a pulling operation (first operation) of operating the drive part via the trigger valve 30, the contact arm 20 that performs a pushing operation (second operation) of operating the drive part via the trigger valve 30, the timer 8 that measures the time when the drive part can be operated by operating the contact arm 20 and switches an operation mode of the drive part after the time has elapsed, the timer switch 60 that controls the operation of the timer 8, and the link member (transmitting member) 70 that is provided between the trigger 50 and the timer switch 60 and transmits the operation of the trigger 50 to the timer switch 60.

As shown in FIG. 2, the trigger 50 is provided on a side surface of the housing 2 substantially in the middle in the upper and lower direction and on the front end side of the grip 7. The trigger 50 includes a trigger lever 52, a contact lever 54, and a pressing part 55.

The trigger lever 52 is pivotably mounted via a shaft 51 provided in the housing 2 and pivots with the shaft 51 as a fulcrum in response to a pulling operation of the trigger lever 52 by an operator. The pressing part 55 presses one end portion 70*a* of the link member 70 by moving upward with the pivoting of the trigger lever 52. The contact lever 54 is pivotably mounted via a shaft 53 provided in the trigger lever 52 and presses a trigger valve stem 37 upward by pivoting with the shaft 53 as a fulcrum in conjunction with a pushing operation of the contact arm 20 against an object.

As shown in FIG. 1, the contact arm 20 is provided on the tip side of the nose 6 and is connected to a rod 20*a*. The contact arm 20 is configured to be reciprocally movable along an axial direction of the nose 6. The contact arm 20 is urged by a compression spring 20*b* so as to protrude downward from a tip portion of the nose 6 and relatively moves in the direction of compressing the compression spring 20*b* against the nose 6 by its tip portion being pressed against an object. An upper end portion of the rod 20*a* is in contact with the contact lever 54 and presses the contact lever 54 upward in conjunction with a pressing operation of the contact arm 20.

As shown in FIG. 2, the trigger valve 30 includes a pair of lower housing 34*a* and upper housing 34*b*, a pilot valve 35, the trigger valve stem 37, and a spring 38.

The lower housing 34*a* and the upper housing 34*b* are formed of a substantially cylindrical body and are arranged to face each other with a predetermined interval. The passage P1 and the passage P2 communicating with a gap S1 (to be described later) are formed in the upper housing 34*b*.

The pilot valve 35 and the trigger valve stem 37 are accommodated inside the lower housing 34*a* and the upper housing 34*b*. A cap 36 is arranged between the lower housing 34*a* and the trigger valve stem 37, and an inner surface of an upper end portion of the cap 36 is in close contact with an outer peripheral surface of a lower end portion of the pilot valve 35 via an O-ring 35*e*.

The pilot valve 35 is configured to be reciprocally movable with respect to the upper housing 34*b* and the cap 36 in response to the operation of the trigger valve stem 37 and switches the communication or disconnection between the passage P1 on the side of the striking piston 4 and a passage P4 connected to the atmosphere on the side of the trigger valve 30. The gap S1 communicating with the passage P2 is provided between the pilot valve 35 and the upper housing 34*b*. A space inside the pilot valve 35 and the main chamber 15 communicate with each other via a passage P3 formed in an upper end portion of the pilot valve 35. Further, when an O-ring 35*d* mounted on the pilot valve 35 abuts on a lower end edge of the upper housing 34*b*, the upward movement of the pilot valve 35 is restricted, and a path between the gap S1 and the passage P4 is shut off.

The trigger valve stem 37 is arranged inside the pilot valve 35 and the lower housing 34*a* via the spring 38 arranged on the pilot valve 35 and moves up and down in response to the pulling operation of the trigger 50 to switch the operation or non-operation of the pilot valve 35. The trigger valve stem 37 is configured by an elongated substantially cylindrical body extending in the upper and lower direction. The upper end side of the trigger valve stem 37 is urged downward by the spring 38, and the lower end portion of the trigger valve stem 37 is configured to be retractable to the side of the trigger 50 with respect to the cap 36.

A trigger valve chamber 35*a* is provided between an inner wall surface of the cap 36 and a lower surface of the trigger valve stem 37. The trigger valve chamber 35*a* communicates with the main chamber 15 via the space inside the pilot valve 35 and the passage P3, and compressed air is stored in the trigger valve chamber 35*a* in a state (initial state) before the operation of the pilot valve 35. A valve operation control chamber 39 communicating with a passage P8 is provided between an outer peripheral surface of the cap 36 and an inner wall surface of the lower housing 34*a*.

As shown in FIG. 2, the timer switch 60 is a switch that is arranged inside the grip 7 between the timer 8 and the trigger 50 (the trigger valve 30) and is provided for operating the timer 8 in conjunction with the pulling operation of the trigger 50. The operating direction of the timer switch 60 is parallel to the extending direction of the grip 7 (grip axis). The timer switch 60 includes a timer switch housing 62, a timer switch stem 64, and a timer switch valve 66.

The timer switch stem 64 and the timer switch valve 66 are accommodated in the timer switch housing 62 so as to be movable in a front and rear direction. A passage P5 communicating with the main chamber 15 is formed in the upper portion of the timer switch housing 62.

The timer switch stem 64 is an elongated substantially cylindrical body extending in the front and rear direction. The timer switch stem 64 is configured to be movable in the front and rear direction with the pivoting of the link member 70, which pivots when the one end portion 70*a* of the link member 70 is pushed up by the pressing part 55 of the trigger 50 by operating the trigger lever 52. The tip portion of the timer switch stem 64 protrudes into a space S5 formed between the trigger valve 30 and the timer switch 60 and is in contact with the other end portion 70*b* of the link member 70.

The timer switch valve 66 is arranged coaxially with the timer switch stem 64 and in contact with a rear end surface of the timer switch stem 64 and is urged toward the timer switch stem 64 by a spring 67. The timer switch valve 66 is configured to be movable in the front and rear direction in the timer switch housing 62 in response to the operation of the timer switch stem 64, and switches the communication or disconnection between a passage P6 and a passage P7 and between the passage P5 and the passage P6.

As shown in FIG. 2, the link member 70 is a member for converting the movement in the upper and lower direction based on the pulling operation of the trigger 50 into the movement in the front and rear direction for operating the timer switch 60. The link member 70 is configured by, for example, an inverted L-shaped plate member. The one end portion 70*a* of the link member 70 is provided in contact with the pressing part 55 of the trigger 50, and the other end portion 70*b* is in contact with the timer switch stem 64 of the timer switch 60. A curved portion of the link member 70 is pivotably supported by a shaft 72. The link member 70 is urged toward the trigger 50 by a spring (not shown) provided on the shaft 72 and air pressure applied to the timer switch stem 64.

The other end side of the link member 70 is arranged in the space S5 formed between the trigger valve 30 and the timer switch 60, and the one end side of the link member 70 is arranged between the trigger valve 30 and the trigger 50. In the present embodiment, a first length L1 between an acting portion of the one end portion 70*a* of the link member 70 and the shaft 72 is set longer than a second length L2 between an acting portion of the other end portion 70*b* of the link member 70 and the shaft 72, and the operating amount of the trigger 50 is set longer than the operating amount of the timer switch stem 64 of the timer switch 60. In this way, in the present embodiment, the operating amount of the timer switch stem 64 of the timer switch 60 can be arbitrarily set by setting a ratio (lever ratio) of the first length L1 and the second length L2 of the link member 70.

As shown in FIG. 3A, the timer 8 measures a predetermined time that allows the operation of the contact arm 20, and switches from an operation mode in which the striking of the nailing machine 1 can be performed to an operation mode in which the striking of the nailing machine 1 is prohibited after a lapse of a predetermined time. The timer 8 includes a timer piston 80 that generates compressed air for timekeeping as a load, and a timer piston spring 81 that urges the timer piston 80. An example of the predetermined time of the timer 8 is, for example, 3 seconds to 5 seconds, but the predetermined time is not limited to this.

Further, the timer 8 includes timer piston housings 82A to 82F that movably support the timer piston 80 and form a flow path through which air passes. Furthermore, the timer 8 includes a preset piston 83 that operates the timer piston 80, a preset piston spring 84 that urges the preset piston 83, and a preset piston housing 85 that movably supports the preset piston 83.

The timer 8 is configured such that the timer piston 80 and the preset piston 83 can move along the extending direction of the grip 7. In the timer 8, the timer piston housings 82A to 82F are arranged along the extending direction of the grip 7, the timer piston housing 82F movably supports the timer piston 80, and the timer piston housings 82A to 82E movably support a timer piston shaft 86 of the timer piston 80.

A Y-ring 80*a* that has a Y-shaped cross section is fitted to the outer periphery of the timer piston 80. The Y-ring 80*a* rubs on an inner peripheral surface of the timer piston cylinder 80*d*.

The timer 8 is configured such that the cylindrical timer piston housing 82C is inserted inside the timer piston housing 82B and the timer piston housing 82D, and the timer piston shaft 86 passes through the inside of the timer piston housing 82C.

Further, in the timer 8, a gap between the timer piston housing 82B and the timer piston housing 82D communicates with a passage P9 connected to the main chamber 15 to form a flow path through which air passes. Further, in the timer 8, a gap between the timer piston housing 82B and the timer piston housing 82D, a gap between the timer piston housing 82B and the timer piston housing 82C, and a gap between the timer piston housing 82B and the timer piston housing 82A communicate the passage P9 and the passage P8 with each other to form a flow path through which air passes.

In the timer piston 80, a flow path forming recess 87*b* having a concave shape along the circumferential direction is formed in the vicinity of substantially the center of the timer piston shaft 86 in an axial direction.

In the timer 8, a flow path communicating the passage P9 and the passage P8 with each other is closed by an O-ring 87*a* in a state where the O-ring 87*a* provided on the timer piston housing 82B is in contact with the timer piston shaft 86. On the contrary, in the timer 8, the flow path communicating the passage P9 and the passage P8 with each other is opened by a gap between the O-ring 87*a* and the flow path forming recess 87*b* when the timer piston 80 is moved to a position where the flow path forming recess 87*b* faces the O-ring 87*a*.

The preset piston 83 is provided coaxially with the timer piston 80. As shown in FIG. 2 or the like, the preset piston housing 85 is connected to the blowback chamber 18 via the passage P6 formed between the preset piston housing 85 and the timer switch housing 62, the inside of the timer switch housing 62, and the passage P7 formed between the timer switch 60 and the blowback chamber 18, and the like.

As shown in FIGS. 3A and 3B, a passage P10 into which the air compressed in a timer chamber 88 flows by the operation of the timer piston 80 communicates with the timer chamber 88. The throttle part 90 that adjusts the flow rate of air and discharges the air into the atmosphere is provided in the passage P10. The throttle part 90 is provided in the middle of the path of the passage P10 and includes a narrow portion 92 having a smaller flow path area (narrower width) than the other passages, and an adjustment member 94 mounted on the narrow portion 92. The adjustment member 94 is configured so that the flow path area, that is, the flow rate passing through a gap between a peripheral surface of the adjustment member 94 and a wall surface of the passage P10 can be adjusted by adjusting an insertion depth with respect to the narrow portion 92. In this way, in the present embodiment, the switching time of the operation mode of the nailing machine 1 is controlled by adjusting the flow rate of air compressed in the timer chamber 88 using the throttle part 90 and adjusting the moving speed of the timer piston 80 from a timer measurement start position to a timer measurement end position. A filter 96 for preventing the intrusion of lubricating oil or the like into the throttle part 90 is provided on the upstream side of the throttle part 90 in the passage P10.

Operation Example of the Nailing Machine 1

Next, the operation of the nailing machine 1 according to the present embodiment will be described. FIGS. 4 to 11 are operational views of the nailing machine 1 according to the present embodiment.

Figure 4:
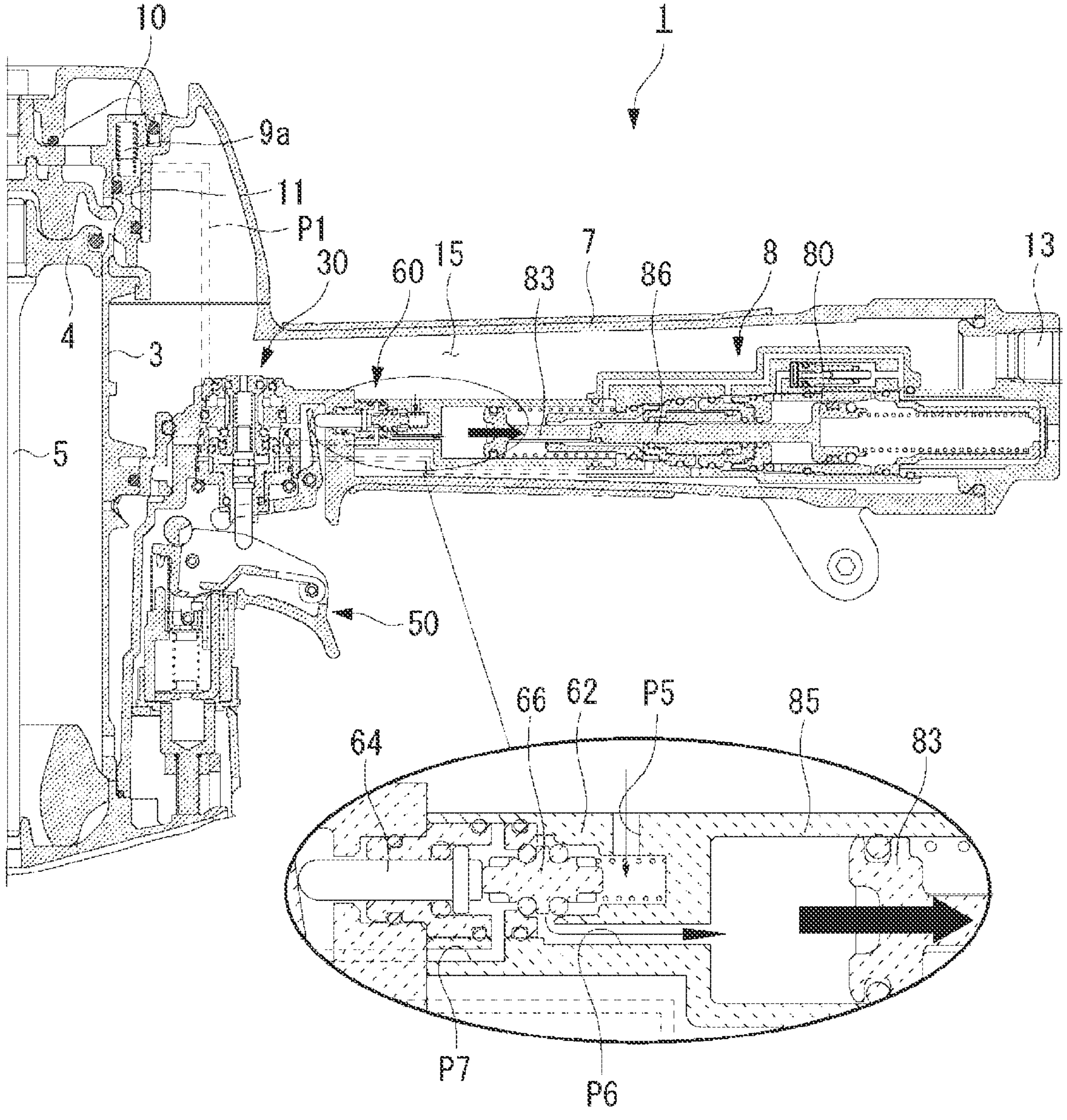
FIG. 4 is an operation view of the nailing machine according to the present embodiment (the first view).
Figure 5:
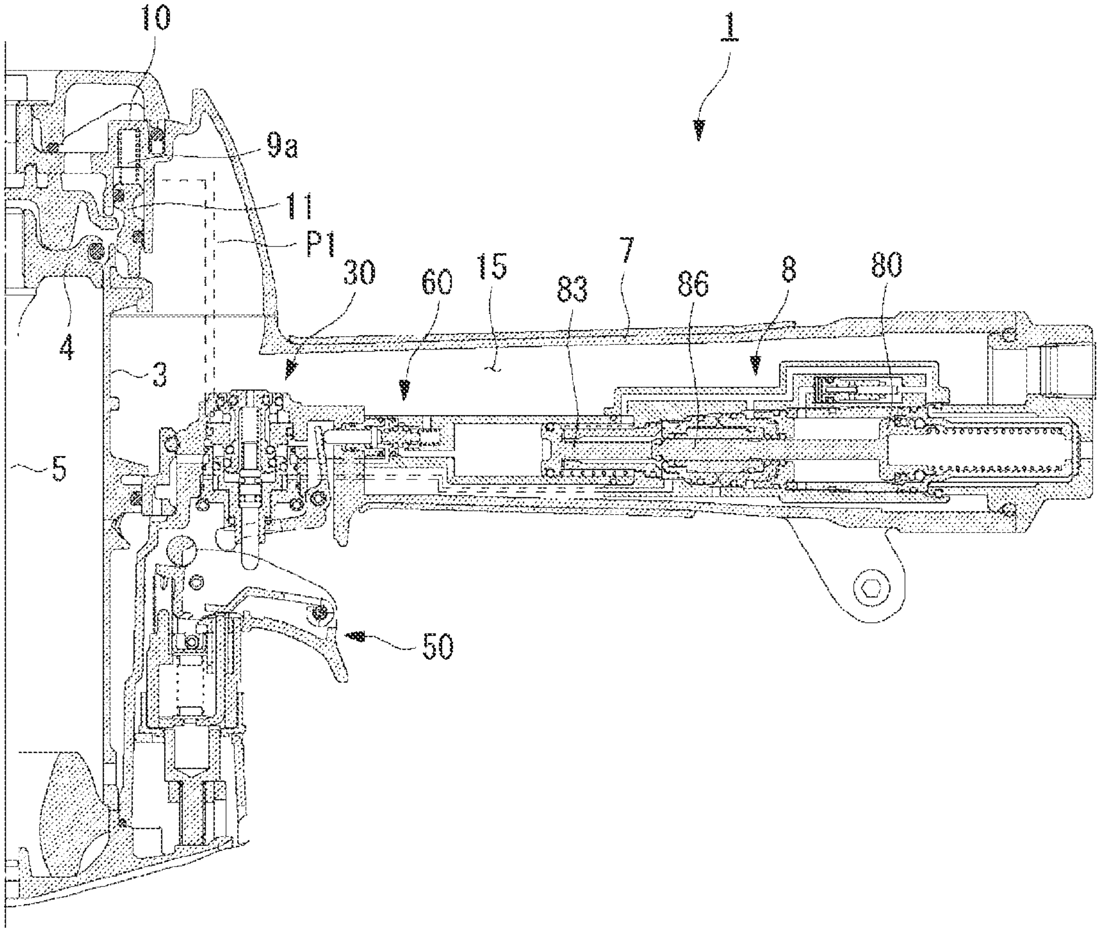
FIG. 5 is an operation view of the nailing machine according to the present embodiment (the second view).

When an air chuck of an air hose is connected to the air plug 13, as shown in FIG. 4, compressed air is supplied from an air compressor into the main chamber 15. The compressed air supplied into the main chamber 15 flows into the preset piston housing 85 via the passage P5, the inside of the timer switch housing 62, and the passage P6. The preset piston 83 and the timer piston 80 are pushed backward and retracted by the compressed air introduced into the preset piston housing 85 and are stopped at the timer measurement start position. In this way, the timer 8 is put into a standby state.

Figure 6:
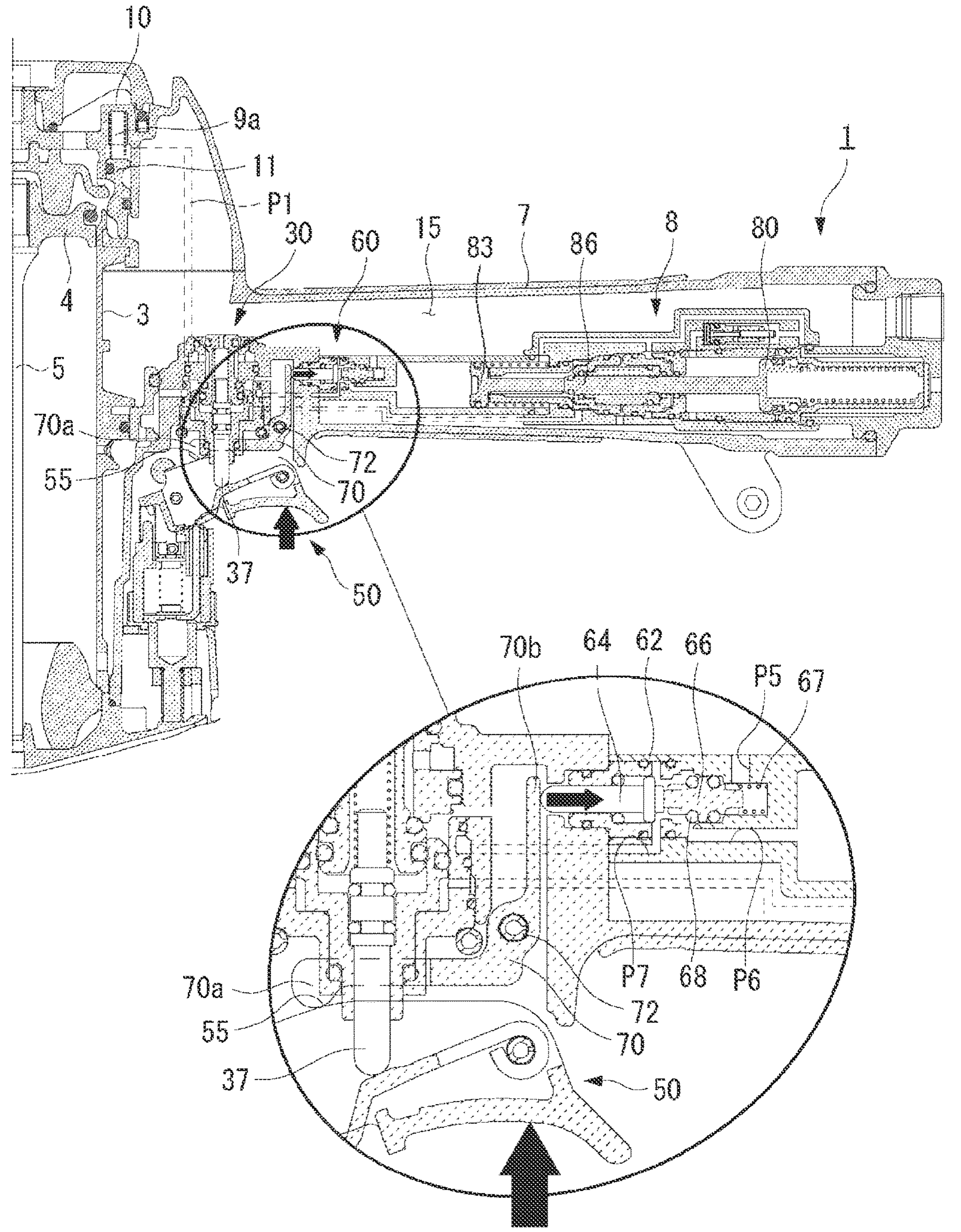
FIG. 6 is an operation view of the nailing machine according to the present embodiment (the third view).

As shown in FIG. 6, when the trigger 50 is pulled by an operator, the one end portion 70*a* of the link member 70 is pushed up by the pressing part 55. Along with this, the link member 70 pivots in a clockwise direction with the shaft 72 as a fulcrum, and the timer switch stem 64 is pushed backward by the other end portion 70*b* of the link member 70. In this way, in the present embodiment, the link member 70 can convert the movement in the upper and lower direction based on the pulling operation of the trigger 50 into the movement in the front and rear direction for pressing the timer switch stem 64. The timer switch stem 64 and the timer switch valve 66 are moved backward against an elastic force of the spring 67. In this way, the passage P6 is opened by the movement of an O-ring 68 of the timer switch valve 66, so that the flow path of air is switched, and the passage P6 and the passage P7 communicate with each other via the inside of the timer switch housing 62.

Figure 7:
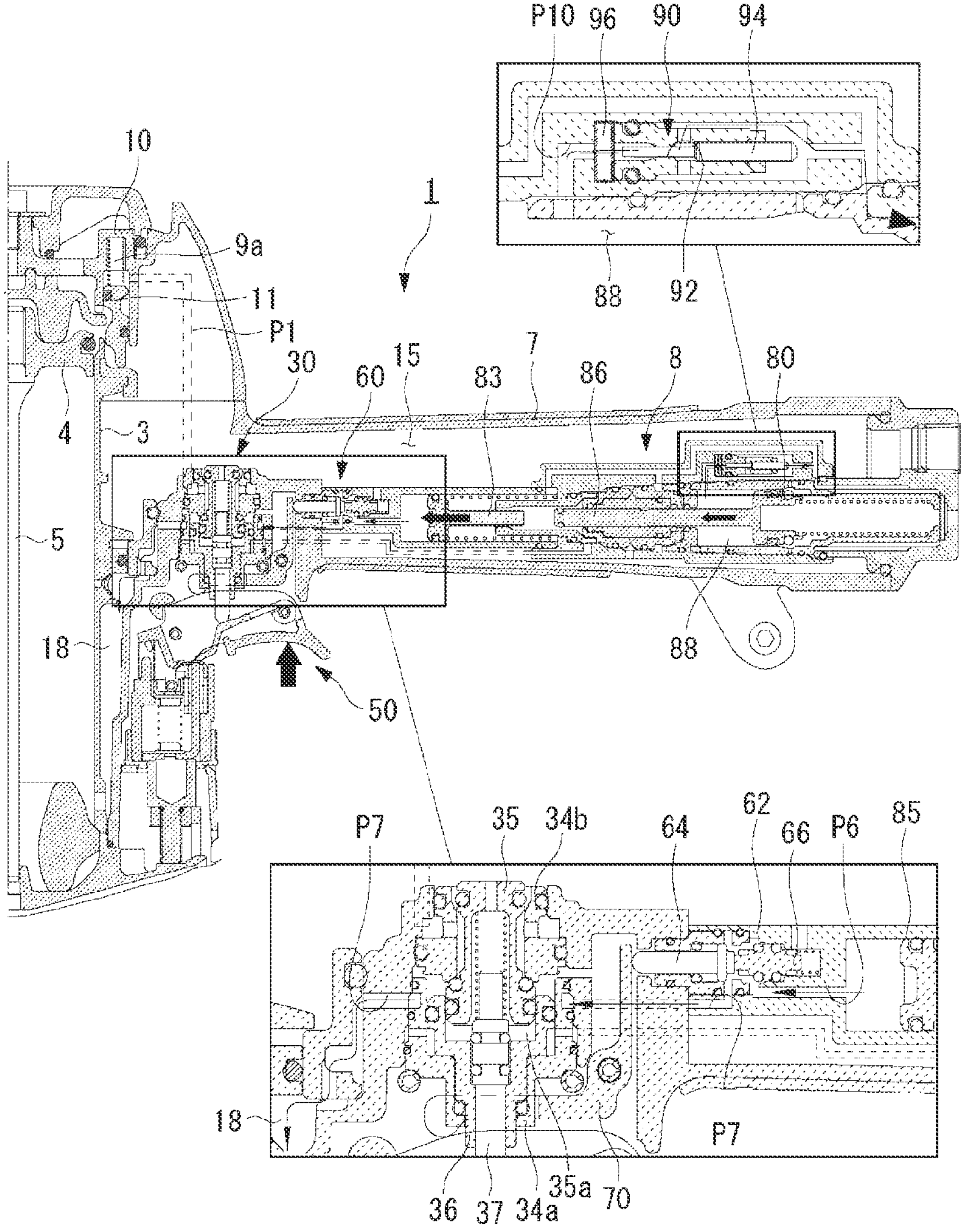
FIG. 7 is an operation view of the nailing machine according to the present embodiment (the fourth view).

As shown in FIG. 7, when the timer switch 60 is operated, the compressed air in the preset piston housing 85 flows into the blowback chamber 18 via the passage P6, the inside of the timer switch housing 62, and the passage P7. The compressed air introduced into the blowback chamber 18 is exhausted to the outside (into the atmosphere) via the inside of the striking cylinder 3.

Along with this, the preset piston 83 advances by the amount of exhausted air in the timer switch housing 62. Further, the timer piston 80 also advances with the movement of the preset piston 83. In this way, the measurement of the timer 8 is initiated. In the present embodiment, due to the movement of the timer piston 80, the compressed air in the timer chamber 88 is gradually exhausted into the atmosphere by passing through the throttle part 90 after flowing into the passage P10. The timer piston 80 gradually advances by the amount of exhausted air in the timer chamber 88.

Figure 8:
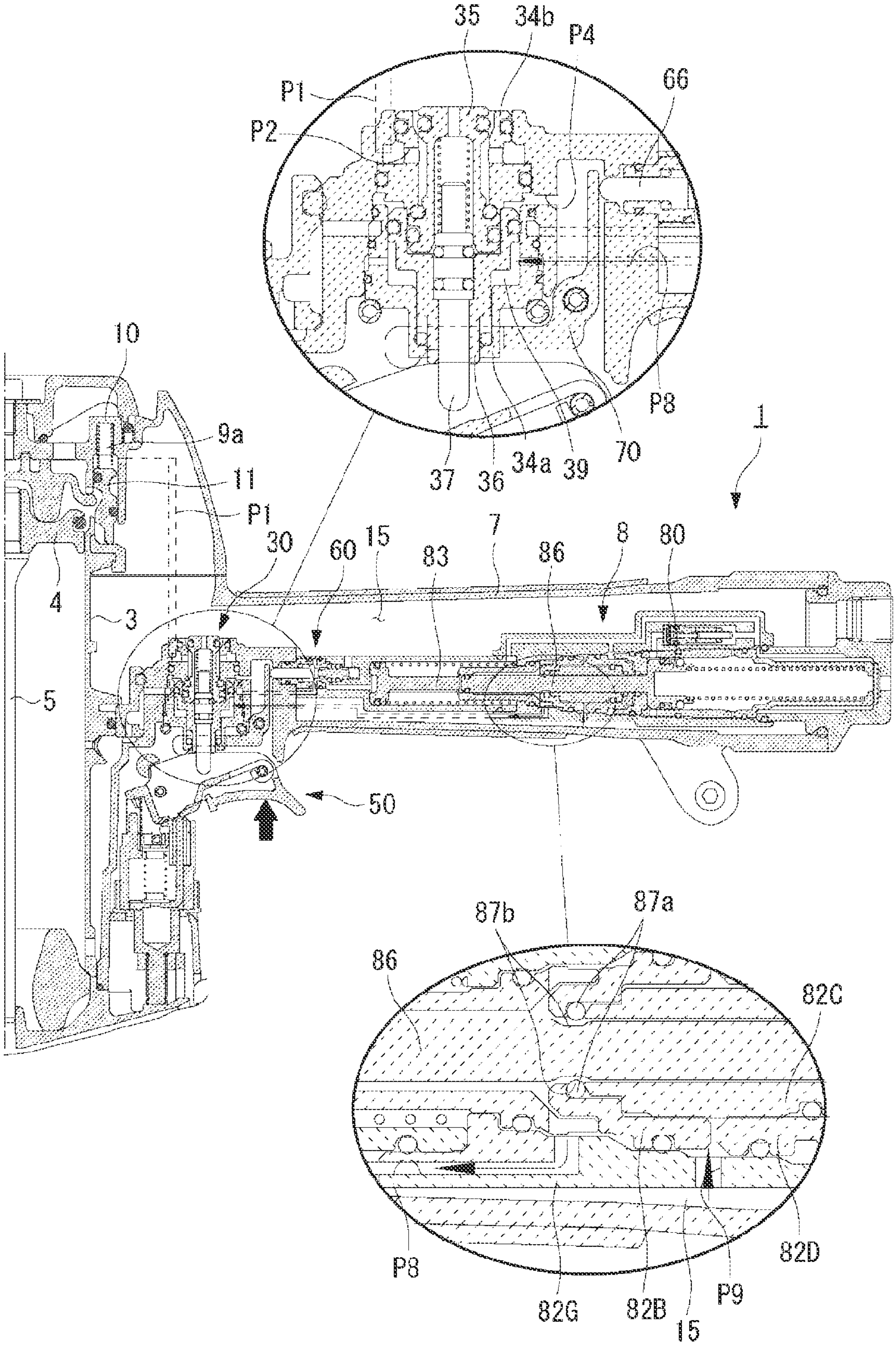
FIG. 8 is an operation view of the nailing machine according to the present embodiment (the fifth view).

As shown in FIG. 8, when the timer piston 80 advances and reaches the timer measurement end position, the timer 8 becomes time-out. At this time, the O-ring 87*a* is located at a position facing the flow path forming recess 87*b*, and the passage P9 and the passage P8 communicate with each other via a gap formed between the O-ring 87*a* and the flow path forming recess 87*b*. In this way, the compressed air in the main chamber 15 flows into the valve operation control chamber 39 via the passage P9, the flow path formed between the timer piston housings 82B and 82C, the gap between the O-ring 87*a* and the flow path forming recess 87*b*, and the passage P8. The cap 36 constituting the trigger valve 30 is pushed up by the compressed air introduced into the valve operation control chamber 39 and abuts on a lower surface of the pilot valve 35 on the upper side, so that the trigger valve chamber 35*a* (see FIG. 7) is closed.

Figure 9:
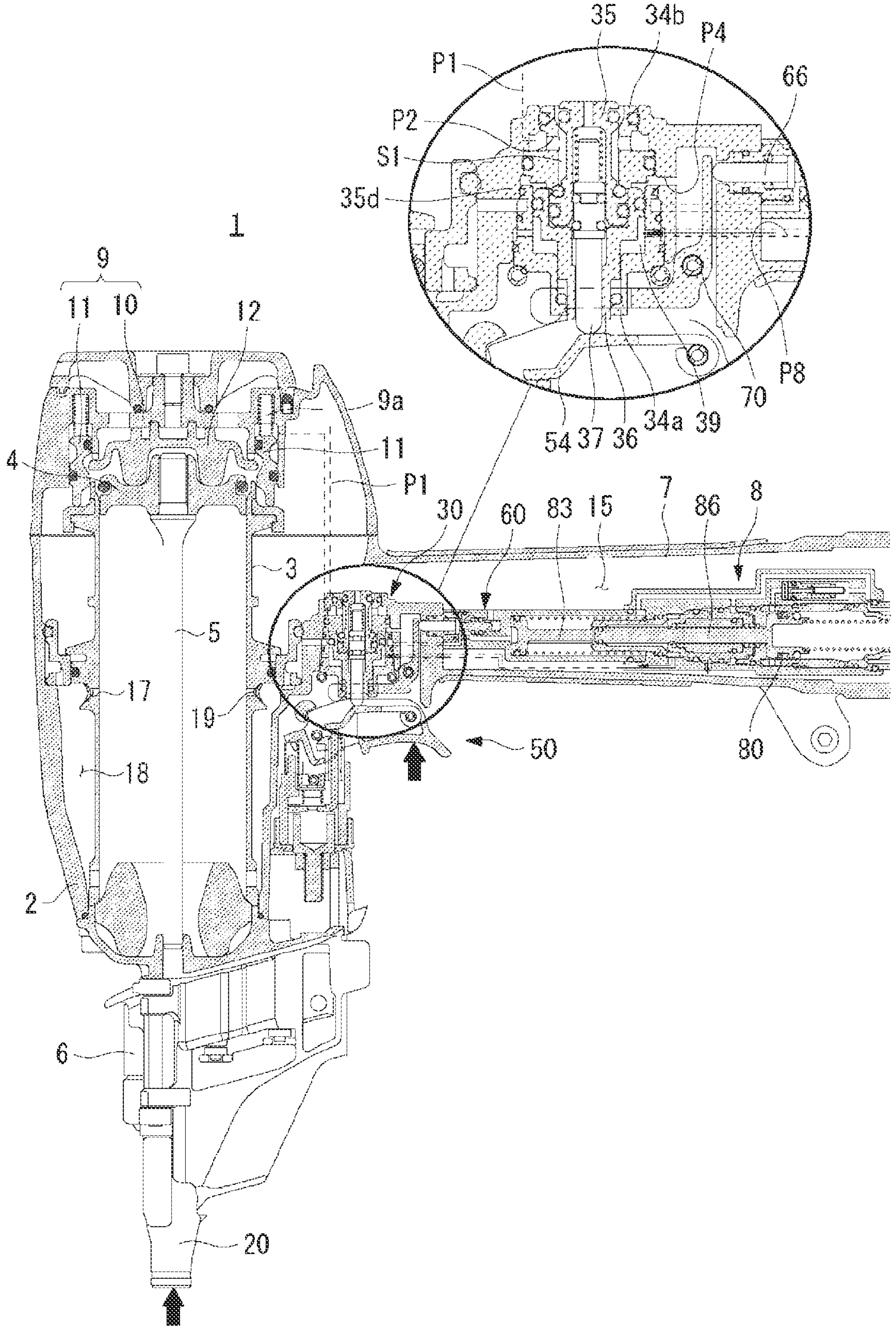
FIG. 9 is an operation view of the nailing machine according to the present embodiment (the sixth view).

When the tip portion of the contact arm 20 is pressed against an object after the timer 8 shown in FIG. 8 becomes time-out, the striking operation of the nailing machine 1 is prohibited. Specifically, as shown in FIG. 9, when the contact arm 20 is pressed against the object, the trigger valve stem 37 is pushed up by the contact lever 54 constituting the trigger 50. However, in the present embodiment, the trigger valve chamber 35*a* formed between the pilot valve 35 and the cap 36 is closed, and the downward movement of the pilot valve 35 is restricted. Therefore, since the flow path communicating the passage P2 (the gap S1) and the passage P4 with each other is shut off by an O-ring 35*d* even when the trigger valve stem 37 is pushed up, the compressed air in the head valve chamber 9*a* is not discharged into the outside atmosphere, and the striking piston 4 does not operate. That is, the striking operation of the nailing machine 1 is prohibited.

Figure 10:
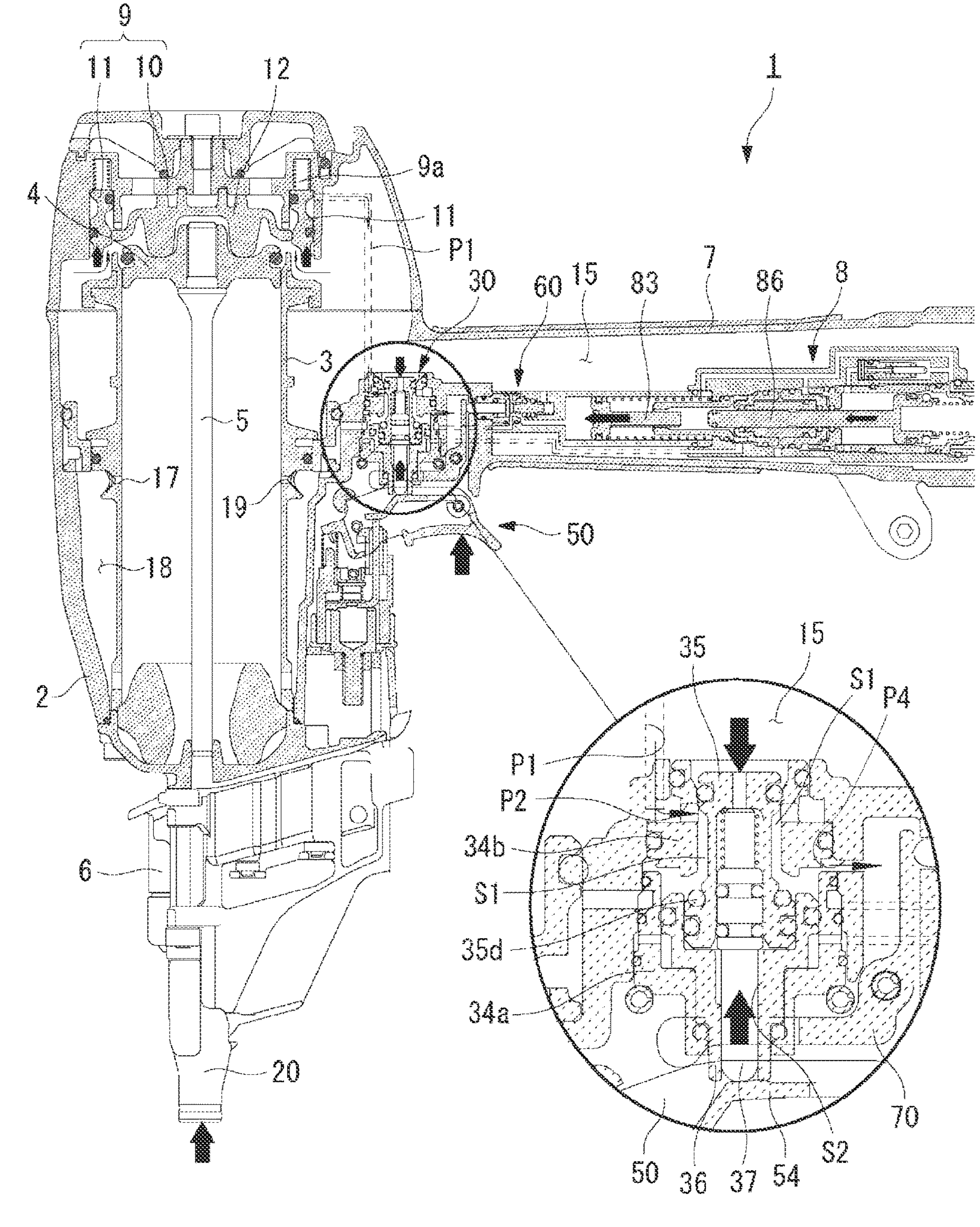
FIG. 10 is an operation view of the nailing machine according to the present embodiment (the seventh view).

When the contact arm 20 is pressed against the object before the timer 8 shown in FIG. 7 becomes time-out, the striking operation is performed. Specifically, as shown in FIG. 10, the contact lever 54 is pushed up when the contact arm 20 is pressed against the object. Along with this, the compressed air contained in the trigger valve chamber 35*a* (see FIG. 7) is exhausted into the atmosphere through a gap S2 between the trigger valve stem 37 and the cap 36.

Subsequently, the upper end portion of the pilot valve 35 is urged downward by the compressed air in the main chamber 15 when the compressed air in the trigger valve chamber 35*a* is exhausted. In this way, the pilot valve 35 is lowered and its lower surface comes into contact with the inner wall surface of the cap 36. The O-ring 35*d* is also lowered with the operation of the pilot valve 35. In this way, the gap S1 and the passage P4 communicate with each other, and the compress air in the head valve chamber 9*a* on the side of the striking piston 4 is discharged into the atmosphere via the passage P1, the passage P2, the gap S1, and the passage P4.

Figure 11:
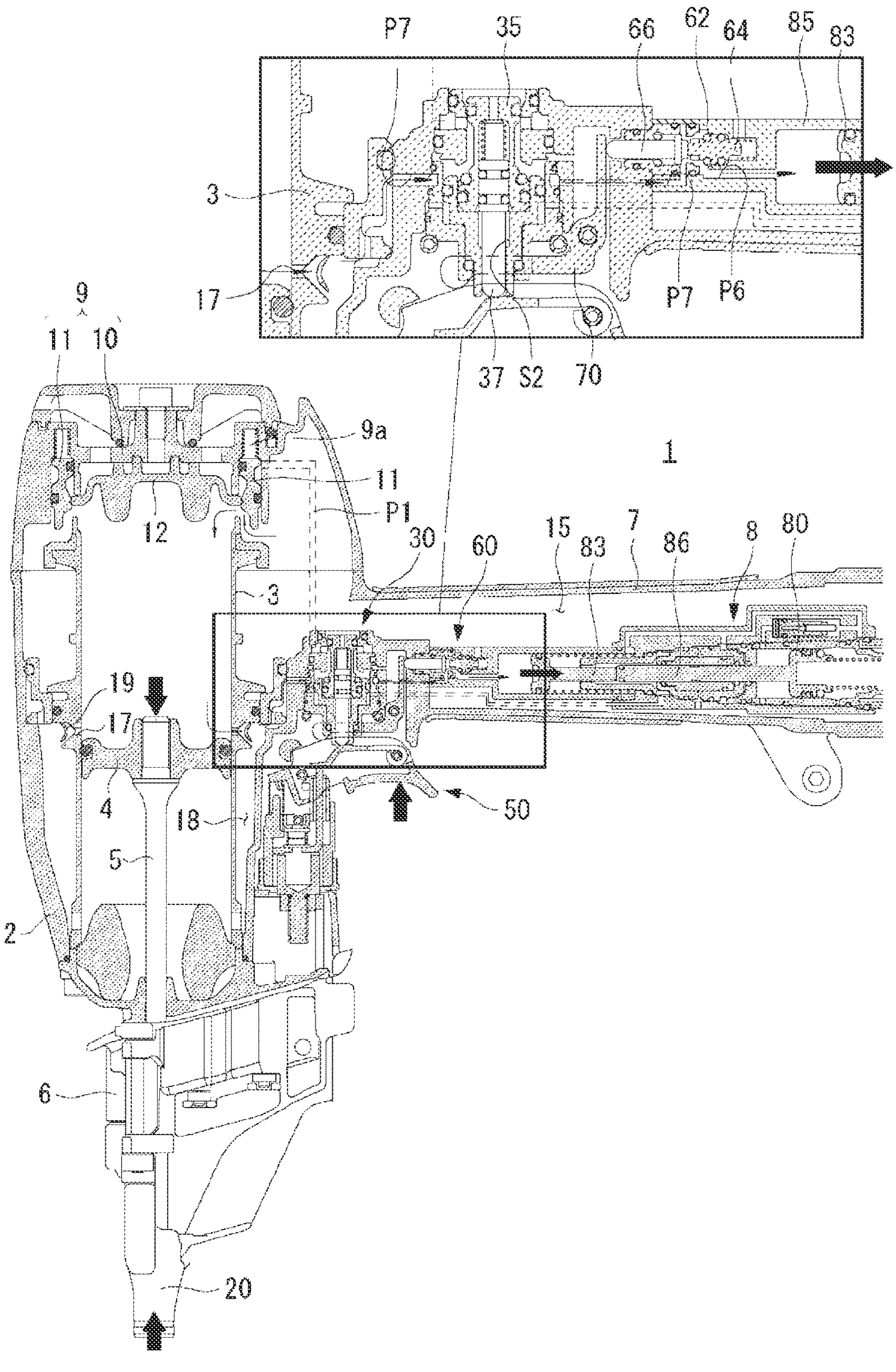
FIG. 11 is an operation view of the nailing machine according to the present embodiment (the eighth view).

In this way, the lower end portion of the head valve piston 11 is pushed up by the compressed air in the main chamber 15, the compressed air in the main chamber 15 flows into the striking cylinder 3 through the gap between the striking cylinder 3 and the head valve piston 11, and as shown in FIG. 11, the striking piston 4 is rapidly lowered in the striking cylinder 3, so that the striking driver 5 strikes a nail into the object. While the striking piston 4 moves to the bottom dead center, the compressed air in the striking cylinder 3 flows into the blowback chamber 18 through the inflow/discharge port 17. The compressed air introduced into the blowback chamber 18 acts on the lower surface of the striking piston 4 moved to the vicinity of the bottom dead center to return the striking piston 4 to the top dead center.

Further, when the pressing of the contact arm 20 against the object is released, the trigger valve stem 37 is lowered together with the contact lever 54, and compressed air is supplied again into the trigger valve chamber 35*a* and the head valve chamber 9*a*. Along with this, the head valve piston 11 is lowered and returned to its original position, and the gap between the striking cylinder 3 and the head valve piston 11 is closed.

Further, as shown in FIG. 11, while the striking piston 4 is moved to the bottom dead center, the compressed air in the striking cylinder 3 flows into the blowback chamber 18 through the inflow/discharge port 17 and flows into the preset piston housing 85 via the passage P7, the inside of the timer switch housing 62, and the passage P6. In this way, the preset piston 83 and the timer piston 80 move to the timer measurement start position, and the timer 8 is reset. In this way, in the present embodiment, the timer 8 is reset using the compressed air for returning the striking piston 4.

As described above, according to the present disclosure, the link member 70 for transmitting the operation of the trigger 50 to the timer switch 60 is provided. Therefore, it is possible to convert the movement in the upper and lower direction based on the pulling operation of the trigger 50 into the movement in the front and rear direction for operating the timer switch 60. In this way, even when the timer 8 is arranged inside the grip 7 extending in a direction (direction substantially orthogonal to) different from the operating direction of the trigger 50, the operation load of the trigger 50 can be efficiently converted into the operation load for operating the timer 8.

Further, according to the present disclosure, the timer switch 60 and the timer 8 can be operated via the link member 70 by pulling the trigger 50. In this way, the operation load of the trigger 50 can be reduced, and as a result, the operation load of the operator can be reduced. Further, the operation load of the trigger 50 can be set depending on the setting (lever ratio) of the first length L1 between the shaft 72 of the link member 70 and the one end portion 70*a* and the second length L2 between the shaft 72 and the other end portion 70*b*.

Further, according to the present disclosure, the timer switch 60 and the timer 8 are arranged together in the grip 7. Therefore, the operation load of the timer switch 60 can be transmitted to the timer 8. Further, the size of the nailing machine 1 can be reduced by arranging the timer 8 and the timer switch 60 together in the grip 7.

Further, according to the present disclosure, the operating directions of the timer switch 60 and the timer 8 are arranged along the grip 7 (according to the grip axis). Therefore, the timer unit including the timer 8 and the timer switch 60 can be assembled to be inserted from the end (rear end) of the grip 7, which simplifies the assembly.

Although the preferred embodiment of the present disclosure has been described in detail with reference to the accompanying drawings, the technical scope of the present disclosure is not limited to such examples. The technical ideas from which any person who has ordinary knowledge in the technical field of the present disclosure can lead to various modifications and changes within the scope of the technical ideas stated in the claims belong to the technical scope of the present disclosure.

For example, although the case where the link member 70 is adopted as an example of the transmitting member has been described in the above embodiment, the present disclosure is not limited to this. For example, at least one or more parts of a gear and a cam may be used to convert the movement in the upper and lower direction based on the pulling operation of the trigger 50 into the movement in the front and rear direction for operating the timer switch 60 to operate the timer 8. Further, needless to say, the operation of the trigger 50 and the operation of the timer switch 60 may be linked by a string-shaped member such as a wire of a belt.

What is claimed is:

1. A pneumatic tool comprising:

a drive part including a striking cylinder and a striking piston movable inside the striking cylinder by compressed air;

a trigger configured to perform a first operation of operating the drive part;

a contact member configured to perform a second operation of operating the drive part;

a timer piston movable from a timer measurement start position to a timer measurement end position; and a timer switch configured to operate by the first operation being transmitted using a transmitting member, wherein the timer piston is configured to start moving from the timer measurement start position toward the timer measurement end position by the timer switch operating by the first operation, the timer piston is in one operation mode of allowing the drive part to operate by the second operation while the timer piston moves from the timer measurement start position to the timer measurement end position, and the timer piston is in another operation mode of prohibiting operation of the drive part by the second operation after the timer piston arrives at the timer measurement end position, and when a striking operation is performed by moving the striking piston of the drive part, the compressed air inside the striking cylinder is supplied, thereby moving the timer piston to the timer measurement end position.

2. The pneumatic tool according to claim 1, wherein an operating direction of the trigger and an operating direction of the timer switch are different.

3. The pneumatic tool according to claim 1, comprising:

a tool body in which the drive part is accommodated; and a grip provided on a side surface of the tool body and extending in a direction intersecting an operating direction of the trigger, wherein the timer switch is disposed in the grip.

4. The pneumatic tool according to claim 1, wherein an operating amount of the trigger is longer than an operating amount of the timer switch.

5. The pneumatic tool according to claim 3, wherein an operating direction of the timer switch is parallel to an extending direction of the grip.

6. The pneumatic tool according to claim 1, wherein the transmitting member is pivotably provided with a shaft as a fulcrum, and wherein one end portion of the transmitting member comes into contact with the trigger, and the other end portion of the transmitting member comes into contact with the timer switch.

* * * * *